US012623650B2

(12) United States Patent
Lefebvre et al.

(10) Patent No.:  US 12,623,650 B2
(45) Date of Patent:      May 12, 2026

(54) SYSTEM, METHOD AND DEVICES FOR AUTOMATING INSPECTION OF BRAKE SYSTEM ON A RAILWAY VEHICLE OR TRAIN

(71) Applicant: Pennsy Digital Inc., West Chester, PA (US)

(72) Inventors: William Lefebvre, West Chester, PA (US); Wayne H. Murphy, Pottstown, PA (US)

(73) Assignee: Pennsy Digital Inc., West Chester, PA (US)

( * ) Notice: Subject to any disclaimer, the term of this patent is extended or adjusted under 35 U.S.C. 154(b) by 779 days.

(21) Appl. No.: 17/191,545

(22) Filed: Mar. 3, 2021

(65) Prior Publication Data

US 2021/0276527 A1     Sep. 9, 2021

Related U.S. Application Data

(60) Provisional application No. 63/012,829, filed on Apr. 20, 2020, provisional application No. 62/984,748, filed on Mar. 3, 2020.

(51) Int. Cl.
B60T 17/22        (2006.01)
F16D 66/00        (2006.01)
        (Continued)

(52) U.S. Cl.
CPC .......... B60T 17/228 (2013.01); B60T 17/221 (2013.01); F16D 66/028 (2013.01); F16M 13/02 (2013.01);
        (Continued)

(58) Field of Classification Search
CPC .... B60T 17/228; B60T 17/221; F16D 66/028; F16D 2066/006; F16D 2066/003; F16M 13/02; G01M 5/0025; G01S 13/08; G01S 13/88; G01S 7/027; G01S 13/931; G01S 2013/9316; G01S 2013/9328
See application file for complete search history.

(56) References Cited

U.S. PATENT DOCUMENTS 5,181,440 A    1/1993  Jagt
5,492,203 A    2/1996  Krampitz et al.
        (Continued)

OTHER PUBLICATIONS

Dragino, "LSN50-V2—Waterproof Long Range Wireless LoRa Sensor Node" Feb. 3, 2020, Dragino.com, pp. 1-4 (Year: 2020).*
        (Continued)

*Primary Examiner* — Aniss Chad
*Assistant Examiner* — Chase L Cooley
(74) *Attorney, Agent, or Firm* — Bonini IP Law, LLC; Frank J. Bonini, Jr.

(57)        ABSTRACT
A system, methods and devices for automating inspection of a brake system on a railway vehicle, such as a freight car or train of a plurality of cars is provided. According to preferred embodiments, the system may be configured for use in conjunction with existing braking systems currently on railway vehicles, such as those on freight cars and other railway vehicles. The system, methods and devices comprise a wireless brake monitoring sensor that includes a radar unit or circuitry and directs a beam toward a target to monitor a condition or position of a brake or brake component.

19 Claims, 5 Drawing Sheets

(51) Int. Cl.

| | |
|---|---|
| *F16D 66/02* | (2006.01) |
| *F16M 13/02* | (2006.01) |
| *G01M 5/00* | (2006.01) |
| *G01S 13/08* | (2006.01) |
| *G01S 13/88* | (2006.01) |

(52) U.S. Cl.
CPC ........... *G01M 5/0025* (2013.01); *G01S 13/08* (2013.01); *G01S 13/88* (2013.01); *F16D 2066/006* (2013.01)

(56) References Cited

U.S. PATENT DOCUMENTS

| | | | |
|---|---|---|---|
| 6,364,068 B1 | 4/2002 | Ring et al. | |
| 6,802,502 B2 | 10/2004 | Hasegawa et al. | |
| 6,904,698 B2 | 6/2005 | Halliar et al. | |
| 2010/0302021 A1 | 12/2010 | Gaughan | |
| 2021/0061247 A1* | 3/2021 | Koziol | F16D 66/027 |
| 2021/0237696 A1* | 8/2021 | Kumar | B60T 13/665 |
| 2022/0221016 A1* | 7/2022 | Sienkiewicz | H04W 4/80 |

OTHER PUBLICATIONS

Industrial components group, Ball Lock Pins—T Handle, 2016, industrialcomponentsgroup.com (Year: 2016).*

Threeaxis, Hictop 3DP-17 SN04 Z sensor mount, 2017, thingiverse.com, p. 1 (Year: 2017).*

Infineon, Iindustrial Radar Sensing, 2018, Infineon Technologies, pp. 10 and 19 (Year: 2018).*

U.S. Department of Transportation, Federal Railroad Administration, Research Results, entitled "Evaluation of the Brake Piston Travel Sensor System", RR 09-01, Sep. 2009.

* cited by examiner

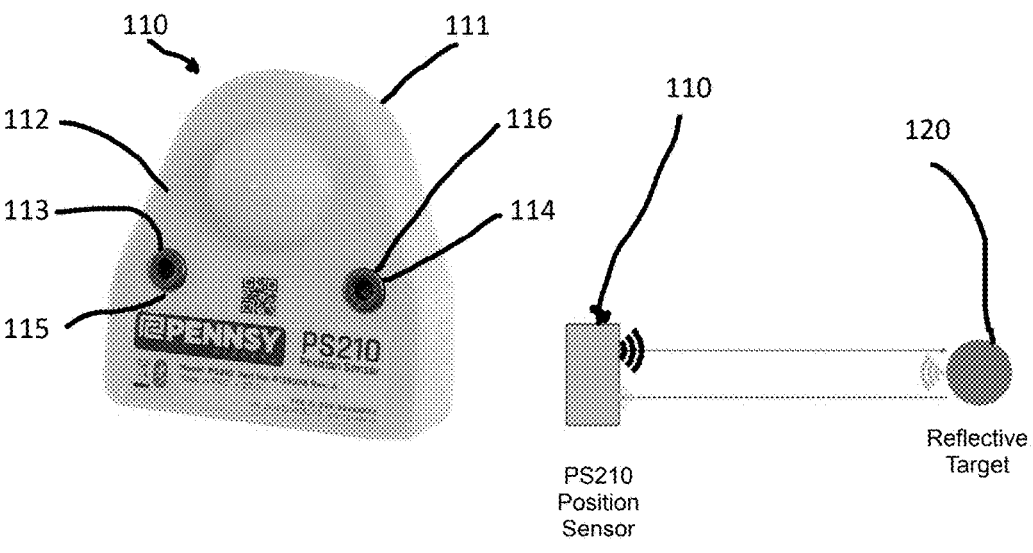
FIG. 1
FIG. 2
Flexible, standards-based communication
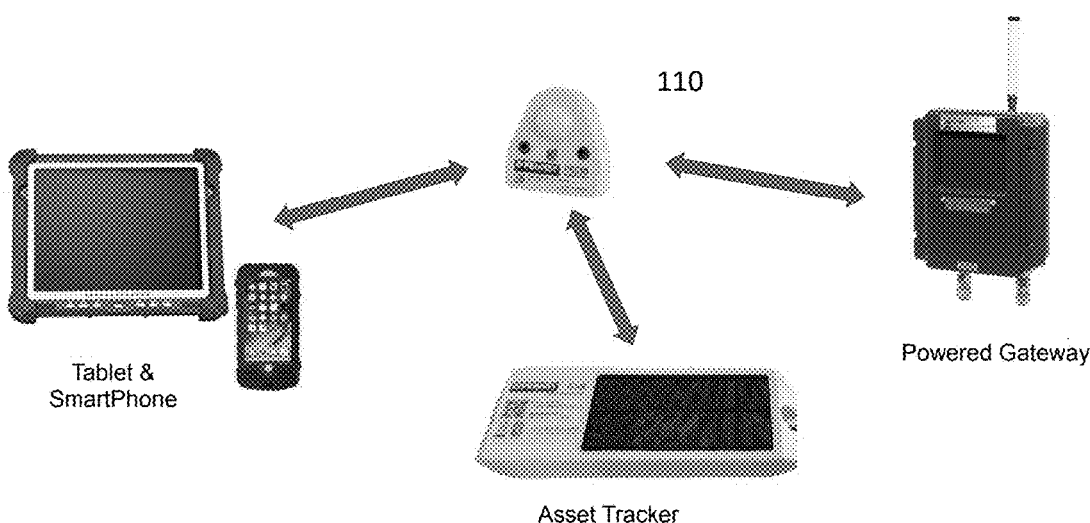
FIG. 3

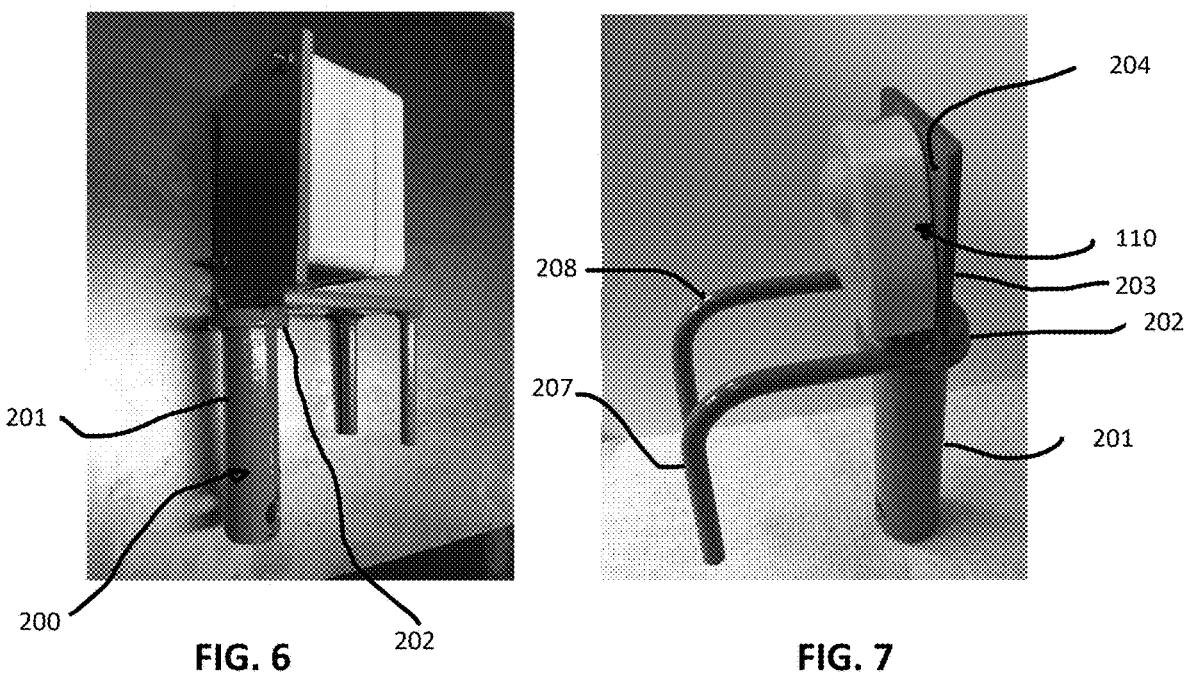
FIG. 6
FIG. 7
FIG. 8
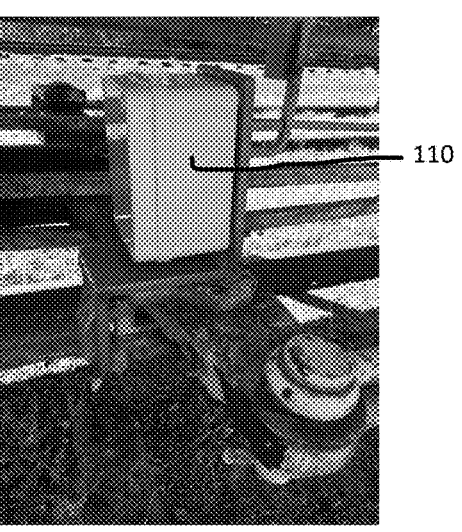
FIG. 9

SYSTEM, METHOD AND DEVICES FOR AUTOMATING INSPECTION OF BRAKE SYSTEM ON A RAILWAY VEHICLE OR TRAIN

CROSS-REFERENCE TO RELATED APPLICATIONS

The benefits under 35 U.S.C. §§ 119 (e) and 120 of the following are hereby claimed: U.S. Provisional Application Ser. No. 62/984,748, filed on Mar. 3, 2020, and U.S. Provisional Application Ser. No. 63/012,829, filed on Apr. 20, 2020, the complete contents of which are incorporated herein by reference.

BACKGROUND OF THE INVENTION

1. Field of the Invention

The invention relates to the field of railway vehicles, and more particularly to braking systems of a freight car or train and the inspection of the system and brakes.

2. Brief Description of the Related Art

Typically, most freight cars have a braking system that may be applied in one of two ways, via a pneumatic air braking system or through a mechanical hand brake. Typically, air brakes are used in a train and hand brakes are applied on individual freight cars to secure them in yards or sidings. Currently, there are standards and requirements regulating under which circumstances the hand brakes need to be applied. The regulations are largely to promote safety.

When freight cars are assembled into a train, a mandatory test of the air brake system must be conducted on each train and each car in the train by a qualified person. The brakes on each car should apply in response to an initiation by a controlling locomotive or yard test device and should remain applied until a release signal has been given. Air brakes use a pneumatic cylinder and a piston to apply or release the brakes. Piston travel must be inspected on each freight car while the brakes are applied to confirm they have been actuated and that they are properly adjusted. Cars that fail the inspection must be repaired or removed from the train. This manual, visual inspection process takes time and is often conducted in difficult circumstances, requiring the diligence of qualified person. The inspector is typically required to walk the length of the train in order to inspect each car. No record of the inspection is generated.

In yards where freight cars are disconnected from a train, individual cars must be secured using a mechanical hand brake assembly. Before disconnected freight cars are moved within the yard, the hand brake must be released. Failure to do this causes damage to the wheels on the freight car, damage which may be observed and rectified almost immediately or damage that may take months or years to become evident. Determining whether the hand brake is applied or released when it should be, again relies on visual inspection with no record being maintained.

In some circumstances hand brakes are applied on several freight cars in a train when the train needs to be secured in a stationary location for long periods of time. In these circumstances the hand brakes are applied as a back up to the air brake system. The number of hand brakes applied is important to prevent a runaway train in the event the air brakes fail. It is also important to ensure that all hand brakes are released before the train resumes its journey. In both cases, the process for securing and releasing the train is manual, as is recording that it has been done.

The ability to automate the manual inspection process currently used benefits railroad train operators and railcar owners alike. Providing an automated, digital method to inspect that the brakes work, are adjusted correctly, are applied and released when they should be will lead to safer and more efficient railroad operation.

Previous approaches to fulfilling this need include Electronically Controlled Pneumatic (ECP) brake systems, camera-based image recognition systems and wireless sensor systems using strain gages or distance sensors. While each approach has its own merits, none have been widely adopted.

ECP brakes are costly, hard to use with mixed (partially equipped) fleets and are difficult to retrofit on existing cars. Vision-based systems using image recognition are growing but are expensive and require sites to be equipped and maintained so do not work in all the use-cases outlined above. Strain-based wireless sensing solutions require a modified component equipped with a strain gage to be put in the load path and only validates that the component load changed, not that the piston has moved. Displacement sensors such as string-pots are not robust enough for the rail environment as are magnetic sensors, while optical sensors are unable to operate effectively in the dusty and dirty railroad environment.

SUMMARY OF THE INVENTION

A system, methods and devices for automating inspection of brake system on a railway vehicle, such as a freight car, passenger car, or train comprised of a plurality of cars, is provided. According to preferred embodiments, the system may be configured for use in conjunction with existing braking systems currently on railway vehicles, such as freight cars and other railway vehicles. The system, methods and devices comprise a sensor which according to preferred embodiments, preferably comprises a wireless sensor.

The system, methods and devices may be used to monitor a condition of a brake to determine whether a brake component is worn or is suitable for continued operation, and also may determine the state of the brake (i.e., whether the brake is engaged or disengaged). According to implementations, the devices may be configured to monitor one or the other or both the brake state and brake condition, and may be selectively operated or actuated to monitor the state, condition, or both at the same time, or at different times or intervals, or in response to different events. As discussed herein, associated sensors, such as a GPS sensor or accelerometer may be utilized in conjunction with the wireless brake monitoring devices, to provide a trigger to measure or not measure a condition or state.

The wireless brake monitoring sensors preferably includes a radar mechanism, such as radar circuitry or a radar unit, to transmit radar signals (high frequency RF electromagnetic radiation) and monitor the brake condition through the feedback from the timing of the radar signals, such as echoes off one or more targets.

According to a preferred implementation, the system may be employed in conjunction with both the main braking system of a railway vehicle (e.g., a freight car pneumatic brakes), as well as the hand brake of the railway vehicle. According to an exemplary embodiment, a first wireless sensor may be provided for measurement of the main brake and a second wireless sensor provided for measurement of the hand brake. The main brake may be measured by monitoring a property of the brake application, such as the piston travel distance. This is measured by the wireless brake monitoring sensor employing a radar unit to track the distance.

In an implementation of the device, system, and method, the wireless sensing devices may be mounted or installed on existing components of the railway vehicle, including the braking system of the railway vehicle. According to some embodiments, a modified braking component, such as a brake pin, may be configured to retain the wireless sensor thereon. The invention also provides signaling brake pins that are configured to implement the wireless monitoring.

According to an exemplary implementation, a railway freight car is provided with two wireless brake monitoring devices. One device may be attached to a modified brake pin, for body mounted brakes, or to the measuring plates of a truck mounted braking system. According to some other embodiments, the device may be attached to another suitable component or location. In this exemplary implementation, the other or second wireless brake monitoring device may be attached to another modified brake pin (used to install the hand brake) to measure changes in the position of the pin (e.g., a distance traveled) when the hand brake is applied. In both cases, the distance measurement relies on a low power radar sensor that uses reflections from other components on the freight car body, truck or braking system.

The wireless brake monitoring sensing devices preferably obtain a distance measurement which relies on a low power radar sensor that uses reflections from other components on the freight car body, truck or braking system, or in some embodiments, a target that is installed on the railway vehicle (or brake system thereof).

The wireless sensors may communicate signals locally, directly or via a mesh network, from the devices to a multiplicity of receivers (gateways) based in a yard, on the train, on the freight car, to a qualified person's mobile device, to a yard-based vehicle or even though a drone. Alternatively, the sensors may be equipped with a low power wide area networking (LPWAN) capability such as cellular-based solution (LTE Cat-M1 or NB-IOT for instance) or a public or private LPWAN technology such as LoraWAN or Sigfox. Other suitable communications protocols may be used, and preferably ones that may operate using low power. A communications module or chipset may be provided as part of the wireless brake monitoring sensor.

According to some embodiments, the method includes configuring the system to work on different types of freight cars, and when the devices are installed, determining the brake state and when brake adjustments are needed. The information provided by the wireless sensing devices may be communicated to a suitable remote device, and preferably a wireless device that may reside in the yard, be carried on a yard vehicle (such as a truck or car), or in a structure or fixture of the rail yard, or other suitable location where brake inspections are to be typically carried out. However, the transmission or exchanges may also be communicated from a local node or device to a remote or distant location through a network (cellular, VPN, Internet, etc.)

The system and devices may be mounted on an existing or modified railway vehicle or braking component, and the beam of the sensor may be directed or focused on a desired predetermined area where the brake component, such as, for example, a piston or other associated part, may travel. The radar sensor may be configured to throw a beam in a desired window or range (where the expected operation of the brake component, such as the piston) is being monitored) and detect the position of a brake component, such as a brake piston or other element. According to some embodiments, the sensor may be mounted to detect movement based on a fixed element, where a target element is provided, and where the sensor is directed to project a beam toward the target, and detect a distance that the target is or may have moved to. The sensor detects the brake position and/or movement of the brake component such as for example, the piston, and the information is made available to one or more processing components to determine the status of the brake. The sensor may be configured to wirelessly communicate with a remote unit, such as a mobile device, tablet or other device.

According to some embodiments, the wireless brake monitoring sensor may be trigger based, with its operation based on a particular response to an external event or measurement, such as an output from an associated sensor. The sensor or event trigger may trigger a brake monitoring measurement to be taken, or it may prevent one. In these embodiments, power is conserved and/or reduced by having the brake monitoring sensor selectively operated. For example, the wireless brake monitoring sensor may be configured to include one or more of GPS chips, accelerometers (such as an accelerometer-based motion sensor) to trigger or prevent measurements.

According to some preferred embodiments, the sensor comprises a radar unit to obtain a distance measurement, and the radar unit relies on a low power radar sensor that uses reflections from other components on the freight car body, truck or braking system to determine the distance measurement. According to some preferred embodiments, the radar unit may provide millimeter accuracy over ranges exceeding 1 m and, preferably is enclosed in a housing or enclosure and is unaffected by dust and dirt.

The present system, method and devices automate the brake inspection process by providing a monitoring solution using low power radar sensors to detect and provide indications of the brake condition and status. Brake monitoring may be carried out by receiving signals generated by the monitoring devices. A remotely situated receiver, such as for example, a tablet, smart phone, computer, may receive or exchange communications with the radar sensors. A single car or multiple cars on a train, and their respective brake conditions, including air brakes as well as hand brakes, may be identified using the monitoring system and radar devices.

According to some preferred embodiments, the system method and devices for monitoring a brake system of a railway vehicle may be applied to or installed on existing railway vehicles without the need for welding, drilling or modification of the rail car components. The devices and system also may be retrofitted to existing railway vehicles and brake components.

Embodiments of the devices may be deployed in conjunction with standard body mounted brake rigging, which uses only two sizes of brake pins. The radar sensors may be mounted or installed as part of the brake pins.

A typical truck mounted brake system with measuring plates are used with the brake monitoring wireless position sensor.

The position sensor devices may be used in association with tablets, smart phones, as well as asset trackers and/or powered gateways, or one or more combinations of these components to comprise a monitoring system. The brake monitoring system and its components may be provided as part of or in association with other communications components and data systems.

BRIEF DESCRIPTION OF THE DRAWING FIGURES

The following figures are provided and described herein:

FIG. 1 is a perspective view of an exemplary embodiment of a wireless position sensor for a railway brake according to the invention.

FIG. 2 is a schematic depiction of a wireless position sensor showing a target and RF waves.

FIG. 3 is a schematic illustration of some exemplary communications exchanges that may be implemented using the wireless position sensor.

FIG. 6 is a perspective view of a first embodiment of a wireless brake system monitoring device shown comprising a brake system sensor.

FIG. 7 is a perspective view of a second embodiment of a wireless brake system monitoring device shown comprising a brake system sensor.

FIG. 8 is an exemplary illustration of a portion of a brake system showing a brake pin.

FIG. 9 is an exemplary illustration of the portion of a brake system of FIG. 8, showing a brake system sensor mounted with a brake pin.

DETAILED DESCRIPTION OF THE INVENTION

Figure 4:
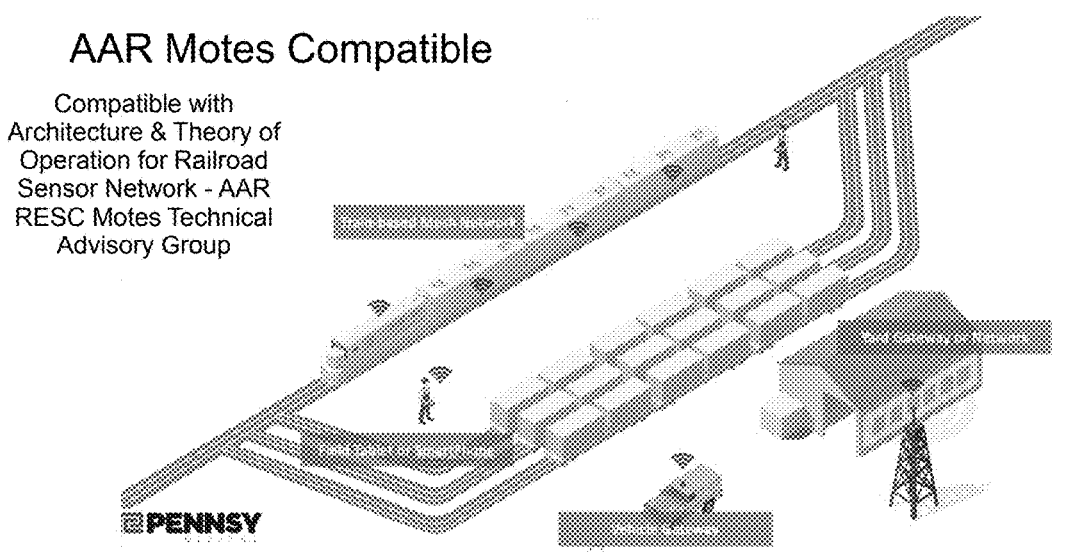
FIG. 4 is a schematic illustration of further exemplary communications exchanges that may be implemented using the wireless position sensor, including an exemplary design for compatibility with AAR Architecture and Theory of Operation for Railroad Sensor Network-AAR RESC Motes Technical Advisory Group.

Referring to FIGS. 1 to 15, embodiments of a wireless brake monitoring system and devices are illustrated. In addition, attached as Appendix A are slides disclosing exemplary embodiments and illustrations of the systems, methods and devices of the invention.

As illustrated in FIG. 1, a monitoring device 110 according to an exemplary embodiment is shown comprising wireless brake sensor 111. The sensor 111 is configured as a unit having a housing 112 for housing components therein and protecting the interior space and components from dirt, debris, and water and moisture intrusion. According to some embodiments the device 110 is configured with a mounting means for mounting the device 110 to another component or structure, such as for example, a railway vehicle (e.g., freight car). A suitable mounting mechanism may be used to mount the device 110 to a structure. Welding, adhesives (e.g., including tapes), and/or magnetic means, such as magnets may be used to secure the device 110 to a structure of the railway vehicle or braking system. The device 110 is shown having mounting means, which according to an exemplary embodiment depicted, comprises a pair of bolts 113, 114, which are shown extending through apertures 115, 116 provided in the device housing 112. The apertures 115, 116 may be configured with counterbores to respectively receive the heads of the bolts 113, 114. The housing 112 preferably seals around each aperture 115, 116 to seal out water, dirt and debris. Matingly threaded bores may be provided on a structure, or mount to which the wireless brake monitoring device 110 may be mounted (see e.g., FIGS. 5, 6, 7, 9-15). As is shown and described herein, according to some embodiments, the devices 110 may be mounted to a modified brake pin. (See e.g., FIGS. 8 and 9).

The device 110 includes at least one power supply for powering the device components that are responsible for emitting signals and detecting the signals and reflections off of the targets, such as railway vehicle structure, brake component or installed target surface (e.g., metal surface or structure provided to serve as a target). According to preferred embodiments, the wireless brake monitoring device 110 comprises a radar unit with radar processing components and/or circuitry therein. According to preferred embodiments the device 110 utilizes a battery as a power source, which is housed within the device housing 112. The battery preferably is a low discharge, long-life battery. One example of a suitable battery is a lithium thionyl chloride type battery.

The device 110 includes suitable circuitry for generating and monitoring a brake condition via generating radar signals and directing those signals at an appropriate target to determine a condition of a brake due to the position of one or more elements of the brake system or structure movable therewith. The radar signal preferably is tuned (in power, as well as frequency, modulation or other parameter) to cover a distance within which monitoring is desired to take place. According to some implementations, the radar signal is directed at a target, which may be a surface or structure that corresponds with the brake movement or status condition of the brake (engaged, disengaged, worn, in need of replacement, or other detectable parameter).

According to preferred embodiments, the device includes circuitry powered by the power supply, such as the battery. The circuitry includes a radar signal generator, and processing components for processing the radar signals, and communications components for communicating the information to a remote component, and according to some embodiments, to receive communications from a remote component. Examples of the device circuitry may include a radar signal generator or transmitter and receiver, transceiver and one or more antennas. The device components may be in an integrated circuit or chip that includes the components needed to process and emit the radar beam and to detect the reflected beam, as well as handle other operations of the radar processing or adjustment. The components may include a radar signal generator and antennas as well as software or other instructions for processing the signals and communicating them to a remote component. For example, a microcontroller or microprocessor may be provided as part of the circuitry. Software including embedded logic, as well as microprocessors, microcontrollers, microcircuits, containing instructions for instructing a microprocessor or processor to process, store and/or communicate the radar signals, may be employed to comprise the circuitry within the unit 110.

According to some preferred embodiments the radar unit is provided in the form of an integrated circuit that is prepared for the conditions and distances of the brakes and brake components, and or target locations, for a typical installation on a railway vehicle (e.g., such as a freight car, passenger vehicle, rail inspection vehicle, or other rail traveling car for which brake monitoring is desirable or beneficial.

The device 110 also includes a communication component, such as for example, a low energy wireless signal transmitter/transceiver, which preferably allows for at least the signal from the wireless sensor device 110 to be transmitted and received by a remote device (e.g., smart phone, tablet, computer, yard station), and preferably allows for two way communications between the sensor 110 and a remote device. A suitable communications component includes a low power signal transmission mechanism (examples of which include Bluetooth® or compatible modules). The brake monitoring sensor devices may be equipped with a low power wide area networking (LPWAN) capability such as cellular-based solution (LTE Cat-M1 or NB-IOT for instance) or a public or private LPWAN technology such as LoraWAN or Sigfox. Other suitable communications components and/or protocols may be used, and preferably ones that may operate using low power may be used.

Figure 5:
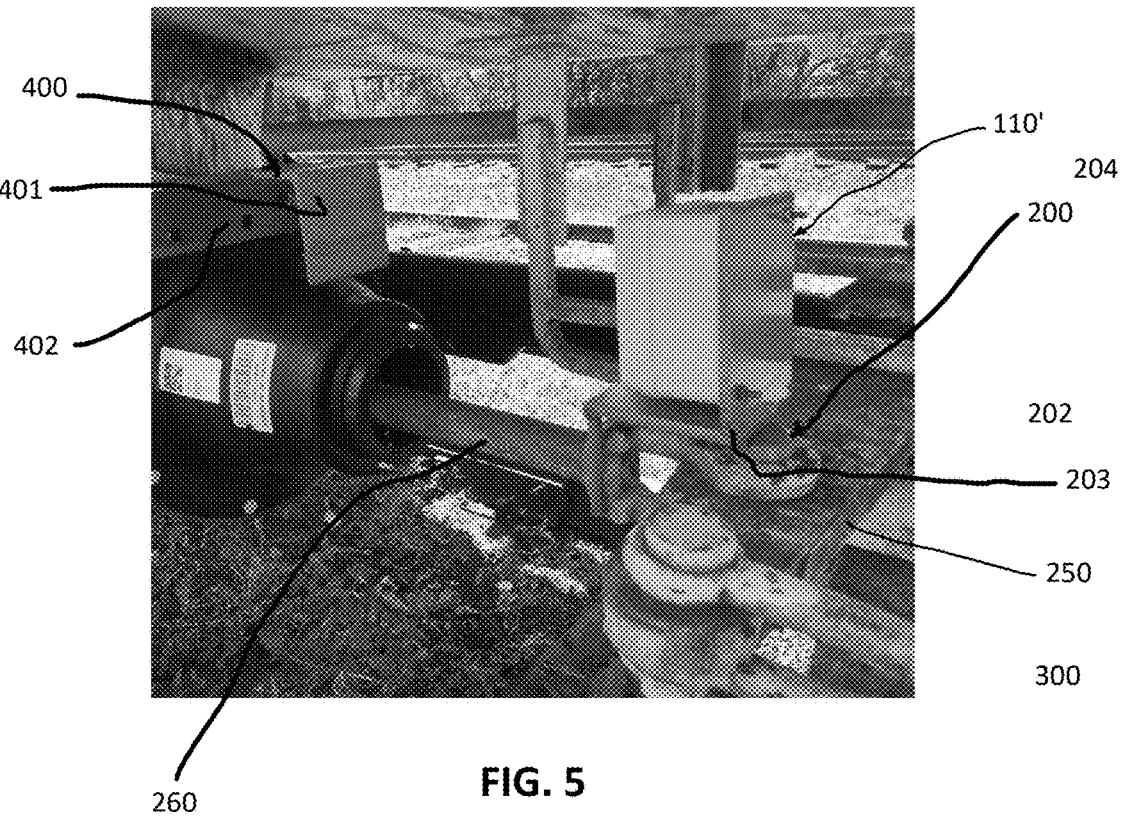
FIG. 5 is a perspective view showing an exemplary embodiment of a brake system monitor installed with a brake system to sense brake cylinder movement on a body mounted brake cylinder.

The device 110 is shown in an implementation where the device 110 is installed on a brake system of a railway vehicle. According to preferred embodiments, the device 110 may be installed on a brake pin. Referring to FIGS. 5-11, the device 110 (and device 110') is shown installed on a brake pin 200. The brake pin 200 includes a pin body 201, a head 202, and a flange 203 connected to the head 202 (see, e.g., FIGS. 6 and 7) The flange 203 is shown having a mounting surface 204 onto which the sensor device 110, 110' is mounted. The flange mounting surface 204 preferably has suitable mounting bores which for the device 110 are similar to those shown in FIGS. 5 and 6 but on the flange 204 located to align with the device bores 115, 116. The bores 115, 116 receive the mounting bolts 113, 114, respectively, therein to secure the sensor device 110 to the pin 200 (or the device 110' to the pin 200, as shown in FIGS. 5 and 6). Although the bolts 113, 114 are shown as an exemplary mounting mechanism, alternate mechanisms for securing the device 110 to the brake pin 200 may be used. In the embodiments illustrated, the brake pin 200 includes a pair of arms 207, 208 which stabilize the pin against rotational movement to keep the sensor device 110 in proximity to the intended target.

As illustrated in FIG. 2, a schematic diagram is depicted to represent the sensor device 110 in an arrangement with a target 120, which may be a brake system component, and preferably its surface, or the surface of a target item installed on the railway vehicle brake system or other location on the vehicle whose distance from the sensor depends on a condition of the associated brake (e.g., whether engaged or disengaged, or worn, or some other condition being monitored via the sensor). The wireless sensor device 110, which comprises a radar unit, projects a beam at the target 120, which is reflected back to the sensor device 110. This may be done continuously or in pulses, as desired when taking measurements, or may be programmed to be carried out autonomously. The radar signals obtained using the device 110 preferably are processed to determine a target distance, which is identified to determine a condition of the brake being monitored. The distance preferably corresponds with the brake or brake component location. In some implementations a baseline condition is first recorded, and relative positions are determined from that baseline. According to some other implementations, the radar unit is configured to detect a range and determine whether the target is within the detection range, which may indicate a condition or the absence of a condition (e.g., brake applied, brake released, brake worn, brake sufficient, brake in need of maintenance).

As shown in FIG. 3, the wireless sensor device 110 preferably is configured to include a communications component or module to send and/or receive communications with a remote device, including for example, any of the remote devices depicted in FIG. 3 and FIG. 4. In FIG. 4 the wireless signal icons represent potential communications points or nodes where wireless brake monitoring device sensors (such as 110, 110') are located on the railway vehicle, and exemplary locations of other wireless devices that may communicate with each other and with the wireless sensor devices 110, 110'.

Referring to FIG. 5, an embodiment of a wireless brake monitoring sensor device 110' is shown mounted on a brake system 300 of a railway vehicle, and faces a target 400. The radar sensor device 110' is similar to the device 110 shown and described but includes an alternate housing 112'. A brake pin 200 with the brake sensor device 110' thereon is installed on the brake system of the railway vehicle. In the illustrated embodiment, the brake sensor device 110' is mounted along with the brake pin 200. A target 400 is shown comprising a metal surface 401 on a structure 402 at a location spaced apart from the wireless radar sensor device 110'. The wireless sensor device 110' includes a radar unit and circuitry, and is shown mounted on the brake arm 250, with a brake piston 260 being shown connected to the brake arm 250. The brake piston 260 changes position and causes the radar unit and target to be at different distances relative to each other. The radar sensor device 110' is used to monitor the brake position and/or change in brake position. The sensed brake condition, which may be a position of the brake as determined by the brake piston or other component, may therefore indicate whether the brake is applied or released, or other condition. In the case where the inspection of the brake is to be carried out. The radar sensor device 110' may be actuated to provide a reading of the target (which in this example in FIG. 5) is the brake piston 260 position or location, based on the target 400. The sensor 110' wirelessly communicates the information to a remote device such as a cell phone, tablet or other suitable device providing an indication as to the brake condition or status.

For example, where the piston extension indicates that a brake pad is likely to be worn due to the extension to apply the brake, then the signal providing that information also may indicate a wear condition of the brake.

The device and system and method may be configured to detect rages of a brake system component, such as the brake piston, and provide monitoring to determine whether the piston reaches a threshold that is indicative of a wear condition, or other problem.

Referring to FIGS. 8 and 9 an example of a retrofit installation of the present devices is depicted, in FIG. 8 showing the typical standard brake pin "P", and in FIG. 9 showing replacement of the standard pin "P" with the new pin 200 that includes the wireless brake monitoring sensor device 110'. The system and method may be carried out by replacement of the brake pin ("P") to provide a wireless sensor that communicates the condition of the existing brake system of the railway vehicle.

Figures 10, 11, 12, 13:
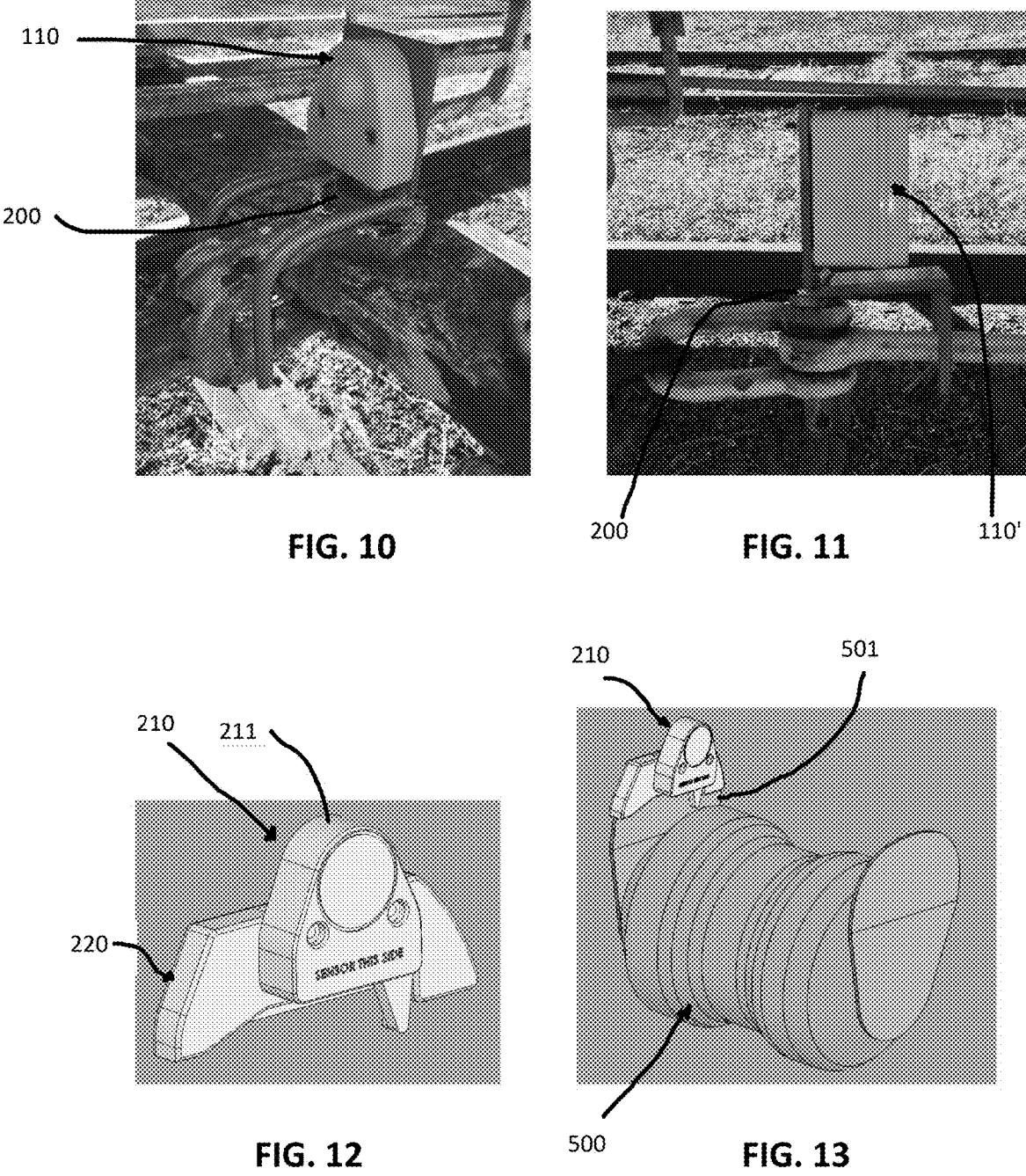
FIG. 10 is a perspective view of the wireless brake position sensor of FIG. 1, shown in an installation on a brake system of a railway vehicle.
FIG. 11 is a perspective view of a portions of a brake system showing the wireless sensor of FIG. 6 mounted on a brake pin that includes a mounting means for the sensor, the brake pin shown being installed in a hand brake of a railway vehicle.
FIGS. 12 and 13 are illustrations of the wireless brake monitoring sensor configured for use on truck mounted brakes of a railway vehicle.

FIG. 10 depicts the sensors 110 and pin 200 shown for use with body mounted brakes, and FIG. 11 shows an example of the sensor 110' and pin 200 used to monitor a hand brake.

Figure 14:
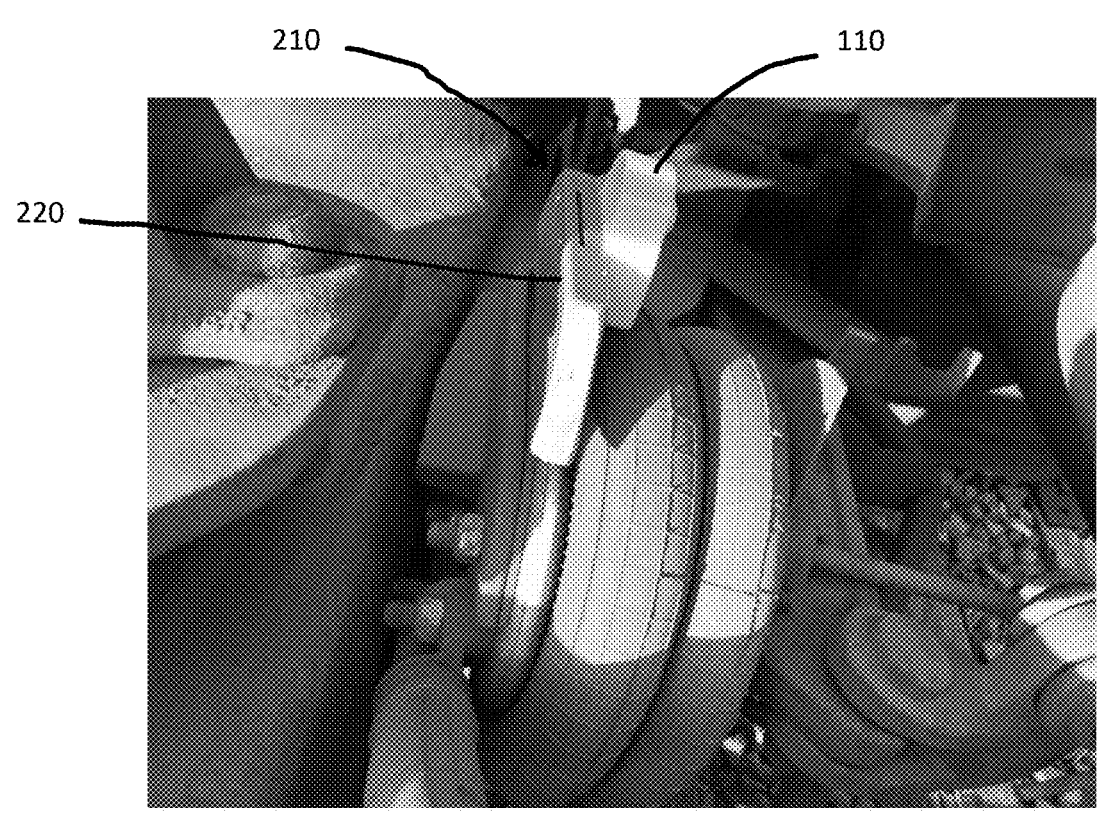
FIGS. 14 and 15 are further illustrations of the wireless brake monitoring sensor configured for use on truck mounted brakes of a railway vehicle shown installed on a measuring plate.
Figure 15:
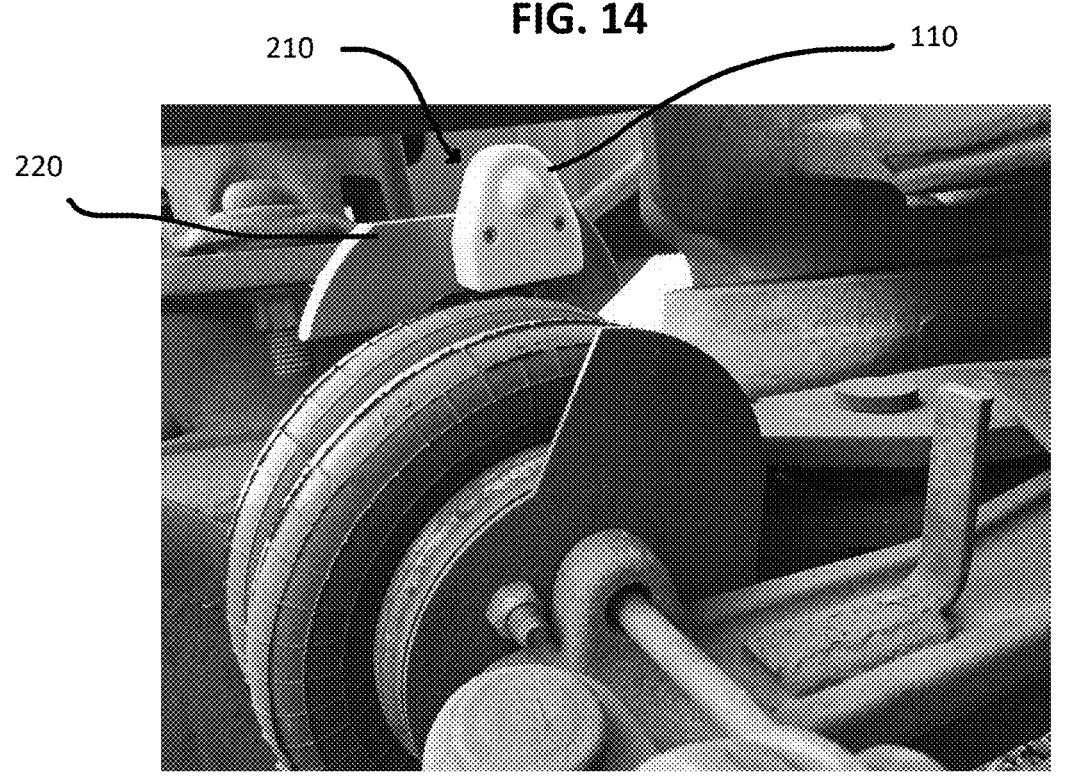

The devices, systems and methods are implemented in embodiments shown in FIGS. 12-15 in conjunction with a truck mounted brake (TMB) 500, with the wireless brake monitoring sensor 210 configured similar to the sensors 110, 110' shown and described herein, including a housing 211 and a mounting component comprising a clip 220 for securing the device 210 to a measuring plate 501 of a brake system 500. The device 210 also may be constructed using the device 110, as shown in FIGS. 14 and 15. As illustrated in FIGS. 14 and 15, the sensor 210 is mounted on the measuring plate 501, and includes the device 110 which is mounted to the clip 220. The radar beam from the device 210 (or the unit 110) is projected at a target to monitor and/or measure the brake status and/or condition.

The present invention provides a monitoring solution for automating the pre-trip brake inspection process. The components are designed for universal applications to existing brake systems, including air brakes, truck mounted brakes, and hand brakes to provide a cost-effective universal application for reliable, long life operation. These and other features of the invention are provided. Although a number of features are discussed herein, a single feature may be combined with one or more other features. For example, the wireless radar devices may be constructed for use on existing systems, and may be mounted thereto, while according to some embodiments, the wireless brake monitoring devices may be provided in conjunction with or include mounting means or mechanisms for installation. Brake pins may be provided and configured to carry the wireless brake monitoring devices, and some brake pins also are provided in accordance with the inventions herein. Targets of the wireless sensor preferably include metal surfaces that the radar beam projected from the sensor device will hit. The radar sensor unit preferably is provided within the device housing and may produce a narrow or focused beam directed to the target. The radar preferably is controlled to hit the target and preferably detects close range distances within the brake system or target surfaces.

According to embodiments of the invention the wireless brake sensor preferably includes a radar unit, which may comprise suitable circuitry and components for propagating a radar beam of a desired length and width and suitable energy to reflect off of an intended target. A self-contained radar module preferably is provided, and is configured to communicate readings for the brake application being monitored.

The radar unit may include a transmitter that generates a desired RF waveform at a suitable or designated power level. The RF power may be derived from any suitable source and preferably one that will reside within the housing of the wireless sensor. Some examples of RF generators include power oscillators, magnetrons, or interaction oscillators, though solid-state amplifiers may be utilized. Radar circuitry may include a modulator, transmitter and duplexer, and an antenna connected to the circuitry to receive and communicate signals, such a signals directed to a target, as well as to receive signals reflected off the target. The antenna also is connected to provide the received signals to a suitable receiver within the circuitry. The signals transmitted and echoes received are processed to determine the proximity of the target or brake component to provide an indication. The indication is compared with the position or level that may be predetermined to constitute an acceptable tolerance level or an indication that the brake is out of range, and is deemed to warrant a further inspection. According to some embodiments, the radar system provides information that identifies whether the brake is in an actuated position or condition, where it is applied, versus a condition or position where the brake is released (not applied).

The radar used is a suitable radar for the distance and components being targeted and monitored, and preferably comprises a low power low energy using solid-state or embedded circuitry, powered by a low discharge long-life battery, such as for example, a lithium thionyl chloride type battery.

The radar system may be a simple pulse generated system, an unmodulated continuous wave (CW) generating system, or other system suitable for providing a moving target such as the brake position or its movement via one or more of the brake system components (such as, for example, a brake piston, or brake arm). Waves generated by the radar unit may be modulated. The wireless brake monitoring sensor unit preferably includes one or more radar antennae or transceivers, which preferably couple RF energy from the radar transmission line into the propagation medium and vice versa. One or more antennas may provide beam directivity and gain for both transmission and reception of electromagnetic energy. The radar unit also includes a radar receiver, so in addition to broadcasting or propagating a beam directed from the antenna, to receive the signals which preferably include those returned by the target object (which may be received through the same antenna or another antenna). According to some embodiments, the radar unit preferably includes circuitry, which may be on a microprocessor, microcontroller, or solid-state or other embedded logic, that is configured to amplify weak target signals to a level that may be utilized for processing to determine the brake condition or position.

The embodiments illustrated preferably may be used in conjunction with the brake pin of a brake system. The installation of the wireless radar sensor devices shown and described herein are self-locating to provide a consistent orientation of the pin. The mounting structure, such as the brake pin configurations shown herein, include a stabilizing component for alignment, such as the arms, which provide a consistent positioning of the device when the brake pin carrying the device is installed on the brake system. The arms preferably provide guides to limit movement, such as rotational movement of the pin outside of a predetermined tolerance range (so that the sensor remains directed to the intended target).

The wireless sensors shown and described herein preferably include a radar unit (e.g., circuitry) that is tuned or otherwise configured to project a radar beam during a brake monitoring event. Preferably, a bake monitoring event may be a suitable time when the brake condition is desired to be monitored. The system, may be configured with software and/or programming to conduct the brake monitoring automatically at automatic or prescheduled time intervals, or may be actuated by an operator to initiate the monitoring. The monitoring by autonomous mode, or operator initiation, may be employed to monitor a single car, a specific car, a plurality of cars, or an entire train of cars. The railway vehicles being monitored, such as, for example, freight cars, preferably are identified by the location of the wireless monitoring device, with each device having a unique identifier (such as a signal identification or other suitable mechanism) so that the reading or readings are identified to correspond with a specific car or location of the brake on the car, or the type of brake of the car (e.g., hand brake or the car's main brake system).

These and other advantages are provided by the invention and the exemplary embodiments disclosed herein. Although specific features may be disclosed in one embodiment, the features may be used together.

What is claimed is:

1. A wireless brake monitoring system for monitoring a state or condition of a railway vehicle brake having a moveable piston that is secured to a brake with a brake pin, the system comprising:

a) a wireless brake monitoring sensor comprising a radar unit contained within a housing and being mountable to a railway vehicle;

b) a power supply contained within the housing;

c) a communications module providing communications between the radar unit and a remotely situated device that is remote of the sensor location;

d) wherein the radar unit is configured to project a radar beam during a brake monitoring event;

e) wherein the sensor includes circuitry with one or more processing components to process signals from the radar unit that determine the brake condition;

f) wherein the brake condition is measurable to determine whether the brake piston has moved and the distance and direction that the brake piston has moved, and wherein the radar signals from the radar unit are used to provide the indication of whether the brake piston has moved and the distance and direction that the brake piston has moved;

g) wherein the radar unit is disposed above the brake pin and faces a fixed target, wherein the fixed target is in a linear direction of the radar unit;

h) wherein the signal path of the radar unit is along the line of direction of movement of the piston whose movement is being measured; and i) wherein the signal path comprises a signal path whose length is between the radar unit and the target, and whose length changes in a linear direction between the radar unit and the target based on the brake piston movement and direction of movement in the signal path direction.

2. The system of claim 1, wherein the remotely situated device is on the same railway vehicle on which the wireless brake monitoring sensor is installed.

3. The system of claim 1, wherein the remotely situated device is remote of the railway vehicle on which the wireless brake monitoring sensor is installed.

4. The system of claim 1, wherein said communications module is configured in the circuitry with said radar unit for communications between the radar unit and a mobile device.

5. The system of claim 4, including a target mountable at a location on said railway vehicle or on the brake system of the railway vehicle, wherein one or the other of said target or said brake sensor is stationary and wherein the other of said target or brake sensor is movable with one or more components of said brake system.

6. The system of claim 1, including a mounting component comprising a brake pin and wherein said housing is mounted to said pin.

7. The system of claim 6, wherein said radar is tuned to detect a range comprising a window that is between several inches to three feet.

8. The system of claim 6, wherein the brake pin includes a head, a pin body, a flange and a pair of arms, and wherein the radar unit is carried on the flange and is positioned in a direction along the line or path of travel of the piston.

9. The system of claim 6, wherein said radar is tuned to detect a range comprising a window of length of the expected operation of the brake piston being monitored.

10. A brake monitoring device comprising:

a) a wireless brake sensor comprising radar circuitry;

b) a brake pin;

c) wherein the wireless brake sensor is mounted on the brake pin;

d) wherein the wireless brake sensor radar circuitry is configured to determine whether the brake piston has moved and the distance and direction that the brake piston has moved;

e) wherein the wireless brake sensor radar circuitry is configured for disposition at a location above the brake pin and facing a fixed target, from which location the wireless brake sensor radar circuitry emits and receives signals comprising radar signals, and wherein the wireless brake sensor radar circuitry processes the radar signals and determines from those processed radar signals whether the brake piston has moved and the distance and direction that the brake piston has moved; and f) wherein the wireless brake sensor emits a radar signal along the line of direction of movement of the brake piston whose movement is being measured;

g) wherein the fixed target and the wireless brake sensor are linear to one another; and h) wherein the signal path of the radar signals comprises a signal path having a signal path direction whose length is between the wireless brake sensor and the fixed target, and whose length changes in a linear direction between the wireless brake sensor and the fixed target based on the brake piston movement and direction of movement in the radar signal path direction.

11. A brake pin comprising:

a) a pin body including a pin shaft;

b) a head;

c) a flange being connected to the pin head and extending upward from and above the pin head;

d) the pin shaft being connected to the pin head and extending downward therefrom; and e) a pair of spaced apart arms projecting downwardly from said flange in the direction of the pin shaft, wherein the spaced apart arms are spaced apart from each other and from the pin shaft.

12. The brake pin of claim 11, wherein at least a portion of each one of said arms is disposed below the pin head.

13. A method for determining a condition of a railway vehicle brake on a railway vehicle, comprising:

a) determining with a wireless brake position sensor a distance between said wireless brake position sensor and a target;

b) wherein at least one or the other of said wireless brake position sensor and said target are installed on a component of the railway vehicle brake system that moves to engage or disengage said brake, the railway vehicle brake system including a piston;

c) communicating a signal from said wireless brake position sensor to a remote device; and d) receiving with a remote device the wireless signal and determining from said signal a condition of the brake;

e) wherein the wireless brake position sensor comprises a radar unit, and wherein determining a distance between said wireless brake position sensor and a target comprises projecting a beam from the radar unit in a direction parallel to the distance being determined; and f) wherein the target is in a linear direction of the radar unit; and g) wherein the beam is projected along a path between radar unit and the target, and wherein the direction of said path is parallel to the direction of movement of the piston whose movement is being measured.

14. The method of claim 13, wherein said brake condition is whether the brake is applied or whether the brake is released.

15. The method of claim 14, including communicating a plurality of signals from a plurality of wireless brake position sensors from a respective plurality of brakes of cars comprising a train, and determining whether the brakes of the train have been applied.

16. The method of claim 14, including communicating a plurality of signals from a plurality of wireless brake position sensors from a respective plurality of brakes of cars comprising a train, and determining whether the brakes of the train have been released.

17. The method of claim 13, wherein said brake condition is a wear condition indicating brake wear.

18. The method of claim 13, including installing the wireless brake position sensor on an existing brake of a railway vehicle.

19. A wireless brake monitoring system for monitoring a state or condition of a railway vehicle brake having a moveable piston that moves along a line or path of movement, the system comprising:

a) a wireless brake monitoring sensor comprising a radar unit contained within a housing and being mountable to the brake or brake pin of a railway vehicle to reside above the linear path of the movable piston; and a target located above the linear path of the movable piston, the movable piston having a linear direction of movement;

b) a power supply contained within the housing;

c) a communications module providing communications between the radar unit and a remotely situated device that is remote of the sensor location;

d) wherein the radar unit is configured to project a radar beam during a brake monitoring event, wherein the beam direction is projected along the direction of the line or path of movement of the brake piston and in the direction of the target; and wherein the beam is coincident with the brake status to provide the indication of whether the pneumatic brake is engaged or released and whether the hand brake is engaged or released;

e) wherein the sensor includes circuitry with one or more processing components to process signals from the radar unit that determine the brake state or condition, which includes the brake piston travel distance and travel direction;

f) wherein the radar unit is disposed above the brake pin and faces the target, wherein the target is in a linear direction of the radar unit; and g) wherein the beam path of the radar unit is between the radar unit and the target, and wherein the beam path has a beam path length between the radar unit and the target that changes in a linear direction between the radar unit and the target based on the brake piston travel distance in the beam path direction.

* * * * *